March 11, 1969  A. L. JOHNSON  3,432,143
PERMANENT ELASTOMETRIC VALVE SEAT CONSTRUCTION
Filed Oct. 18, 1965
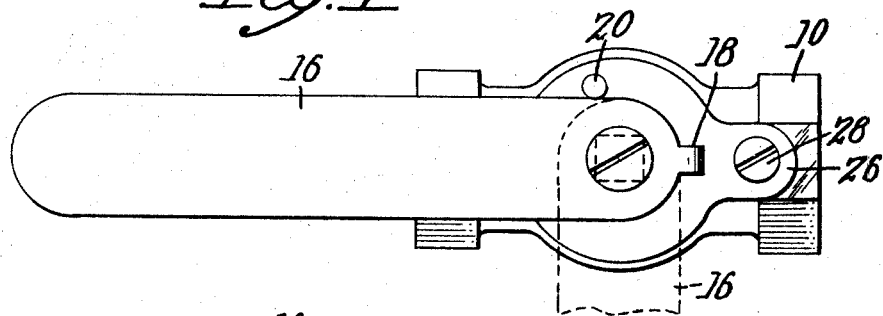
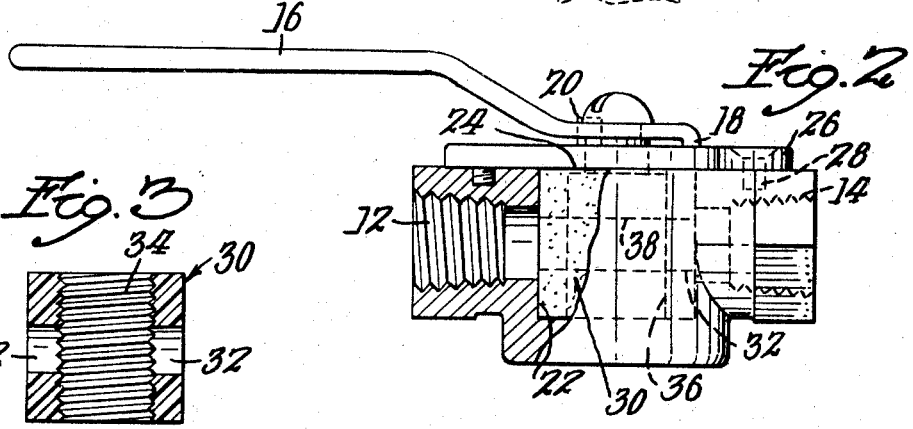
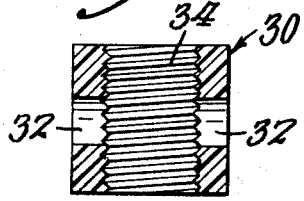
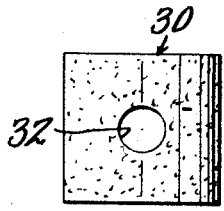
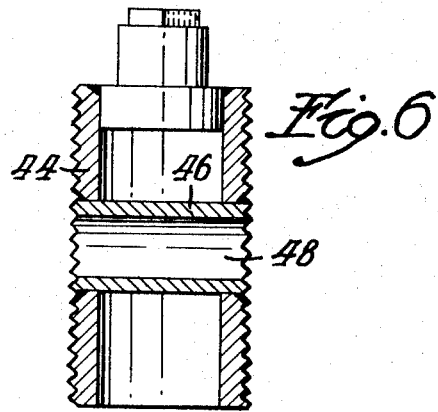
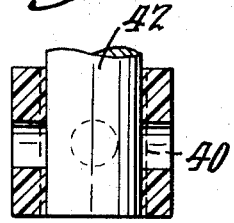
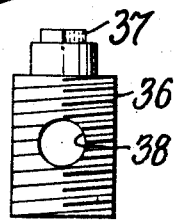
Inventor
Alvin L. Johnson
By Charles R. Fay,
Attorney

United States Patent Office 3,432,143
Patented Mar. 11, 1969

3,432,143
PERMANENT ELASTOMETRIC VALVE SEAT CONSTRUCTION
Alvin L. Johnson, Worcester, Mass., assignor to General Industries, Inc., Worcester, Mass., a corporation of Massachusetts
Filed Oct. 18, 1965, Ser. No. 497,200
U.S. Cl. 251—317
Int. Cl. F16k 5/04, 5/18, 31/50
5 Claims This invention relates in general to valves, and the principal object of the invention resides in the provision of a substantially permanent valve seat in the form of a plug of elastometric material which is bonded or molded directly into the valve housing for substantially permanent position therein, said plug having diametrically opposed holes for flow of fluid material through the valve. This plug is provided with an oversized rotary stem for opening and closing the valve, and being oversized, completely seals the valve against leakage in any position of the stem.

A further object of the invention resides in the provision of a substantially permanent elastometric cylindrical valve seat plug which is molded or bonded into the valve body while in it there is a stem that is then removed and replaced by an oversized stem having a diametrical aperture therethrough for fluid flow, the stem being rotatably mounted therein so as to open or close the valve while at the same time providing for an extremely tight seal.

Other objects and advantages of the invention will appear hereinafter.

Reference is to be had to the accompanying drawings in which:

FIG. 1 is a plan view of the valve;
FIG. 2 is a view in side elevation thereof, parts being broken away and in section;
FIG. 3 is a section through the elastometric plug with interior threads;
FIG. 4 is a view in elevation thereof;
FIG. 5 is a view in elevation of the stem;
FIG. 6 is a sectional view of a modified stem, and
FIG. 7 is a view similar to FIG. 3 showing the same in position with a plain stem.

The present valve is preferably of the quarter turn type. As shown in FIG. 1 it has a main body portion 10 which can be substantially conventional as to the pipe connections at 12 and 14 and it has a handle 16 provided with a stop 18 to cooperate with a fixed stop 20 as is usual for open and closed positions of the valve.

The interior of the valve housing 10 however is preferably cylindrical or perhaps cubical as indicated by the reference numeral 22. This chamber is open at one end as at 24, being closed by plate 26 held in position in any way desired as by fasteners 28 or the like.

The elastometric plug is illustrated in FIG. 3 and indicated by the reference numeral 30. It can be pressed into the chamber 22 having an exterior surface of similar shape but oversize; however it can be bonded by any desired means or it can even be molded in position.

In any event, it is provided with diametrically opposed apertures 32, 32 for flow of fluid through the valve and it is actually in the form of an open cylinder having an axial opening therethrough at 34.

Once it is in position in the valve body, a stem can be forced into it, the stem being oversize with respect to the internal diameter of the axial opening 34.

One way in which this is done is that an initial solid stem is placed in the chamber 22 at the time that the plug is formed. Since the plug is of elastometric material, this initial stem can be removed and a similar stem such as is shown at 36 in FIG. 5 placed in position in the elastometric plug. However the stem 36 is considerably oversized with respect to the original stem and therefore compresses the elastometric plug 30 in the chamber 22 providing a permanent seal. The stem is provided with a transverse through opening 38 for the flow of fluid between the openings 32, 32 when the stem 36 is turned by the handle 16 in the appropriate direction, and also a squared end 37 to fit a squared aperture in the handle 16.

When the initial stem is removed from the molded-in or bonded elastometric plug in the valve housing, it can be backed off by turning it due to the screw threads on it and the oversize stem 36 can also be applied thereto by screwing it in, in a recognized manner.

On the other hand as shown in FIG. 7 in some instances it is satisfactory to provide a straight-sided stem which need not have the screw threads shown on the stem 36 but which is oversize as is illustrated by the dotted lines at 40 in FIG. 7. In other words, an original stem is molded in to form the plug 30, but it is then removed and an oversize stem inserted which will compress the plug to the dotted line position shown. In FIG. 7 the original stem is illustrated at 42 and after it is removed the stem having a size indicated by the reference character 40 is placed in position, the new stem having through holes as before described as at 38.

In the case of the larger size valves, it is not necessary to have a solid stem such as shown in FIG. 5 but a hollow cylindrical one can be built up by the use of a cylinder 44 having a transverse cylinder 46 therein providing the flow opening 48 and this can be either threaded or plain sided as above described.

In any event it will be seen that with the substantially permanent elastometric plug in position, a permanently sealed valve is provided which is open or closed by only a quarter turn, and regardless of whether it is fully open or closed or partly open, it will always be fully sealed off so that it will not leak, particularly through the opening for chamber 22.

Having thus described my invention and the advantages thereof, I do not wish to be limited to the details herein disclosed, otherwise than as set forth in the claims, but what I claim is:

1. A valve comprising a housing having a chamber, said chamber having an open side, a plate closing said chamber at the open side, a substantially permanently positioned elastometric plug in said chamber, said plug being hollow and having a chamber transverse to the direction of flow, the plug having opposite flow apertures therein, a stem in said chamber in the plug, a handle on the stem, said stem having a diameter greater than the original diameter of the chamber in the plug so that it compresses the plug and forms a permanent seal, a flow opening through said stem for alignment with the flow openings in the elastometric plug or selectively for misalignment therewith to close the valve, and means connecting the stem to the handle.

2. The valve of claim 1 wherein said stem is exteriorly screw threaded.

3. The valve of claim 1 wherein said stem is exteriorly plain sided.

4. The method of making a valve which comprises substantially permanently securing an elastometric plug in a chamber in a valve housing wherein said plug has an initial stem embedded therein, removing said initial stem and replacing it by an oversize stem, so that the plug is compressed against the side walls of the housing and forms a permanent seal therewith.

5. The method of claim 4 wherein said initial stem is screw threaded and is removed by backing it off by rotating it and the permanent stem applied thereafter is also provided with screw threads and is assembled by threading it into the plug.

References Cited

UNITED STATES PATENTS

| | | | |
|---|---|---|---|
| 585,687 | 7/1897 | Milner | 251—310 XR |
| 2,766,961 | 10/1956 | Meusy | 251—317 XR |
| 3,199,835 | 8/1965 | Freed | 251—309 |
| 3,206,163 | 9/1965 | Freed | 251—317 XR |

FOREIGN PATENTS

| | | |
|---|---|---|
| 1,072,281 | 9/1954 | France. |
| 1,095,281 | 5/1955 | France. |
| 337,697 | 5/1959 | Switzerland. |
| 240,294 | 10/1925 | Great Britain. |

M. CARY NELSON, *Primary Examiner.*

MICHAEL O. STURM, *Assistant Examiner.*